(12) United States Patent
Odeh

(10) Patent No.: US 6,832,578 B2
(45) Date of Patent: Dec. 21, 2004

(54) BIO-HYDRAULIC TURBINE TESTING SYSTEM

(75) Inventor: Mufeed Odeh, Gill, MA (US)

(73) Assignee: The United States of America as represented by the Secretary of the Interior, Washington, DC (US)

( * ) Notice: Subject to any disclaimer, the term of this patent is extended or adjusted under 35 U.S.C. 154(b) by 0 days.

(21) Appl. No.: 09/874,217

(22) Filed: Jun. 6, 2001

(65) Prior Publication Data

US 2002/0185078 A1 Dec. 12, 2002

(51) Int. Cl.[7] .............................................. A01K 61/00
(52) U.S. Cl. ........................ 119/219; 119/215; 405/83
(58) Field of Search ................. 119/201, 215, 119/219, 221; 405/81, 82, 83

(56) References Cited

U.S. PATENT DOCUMENTS

| | | | | |
|---|---|---|---|---|
| 4,929,122 A | * | 5/1990 | Yoas | 405/83 |
| 5,385,428 A | * | 1/1995 | Taft, 3rd et al. | 405/81 |
| 6,273,639 B1 | * | 8/2001 | Eikrem et al. | 405/83 |
| 6,325,570 B1 | * | 12/2001 | Pohjamo | 119/219 |
| 6,357,389 B1 | * | 3/2002 | March et al. | 119/219 |

* cited by examiner

Primary Examiner—Peter M. Poon
Assistant Examiner—Elizabeth Shaw
(74) Attorney, Agent, or Firm—Ross F. Hunt, Jr.

(57) ABSTRACT

A bio-hydraulic testing system is provided for simulating the effect on fish of at least one hydraulic system component. A water flow introduction device introduces a flow of water into the testing system, and a fish introduction means introduces a plurality of fish into the testing system. A flow introduction conduit receives a flow containing water from the flow introduction device and fish from the fish introduction device. A testing module receives the flow from the flow introduction conduit. Monitoring device monitor and record fish activity in the water flow in the testing module. Fish exit the testing module into a flow exit conduit, and are collected by fish collection device located downstream of the exit conduit. Finally, discharge device discharge the water from the testing system.

21 Claims, 9 Drawing Sheets

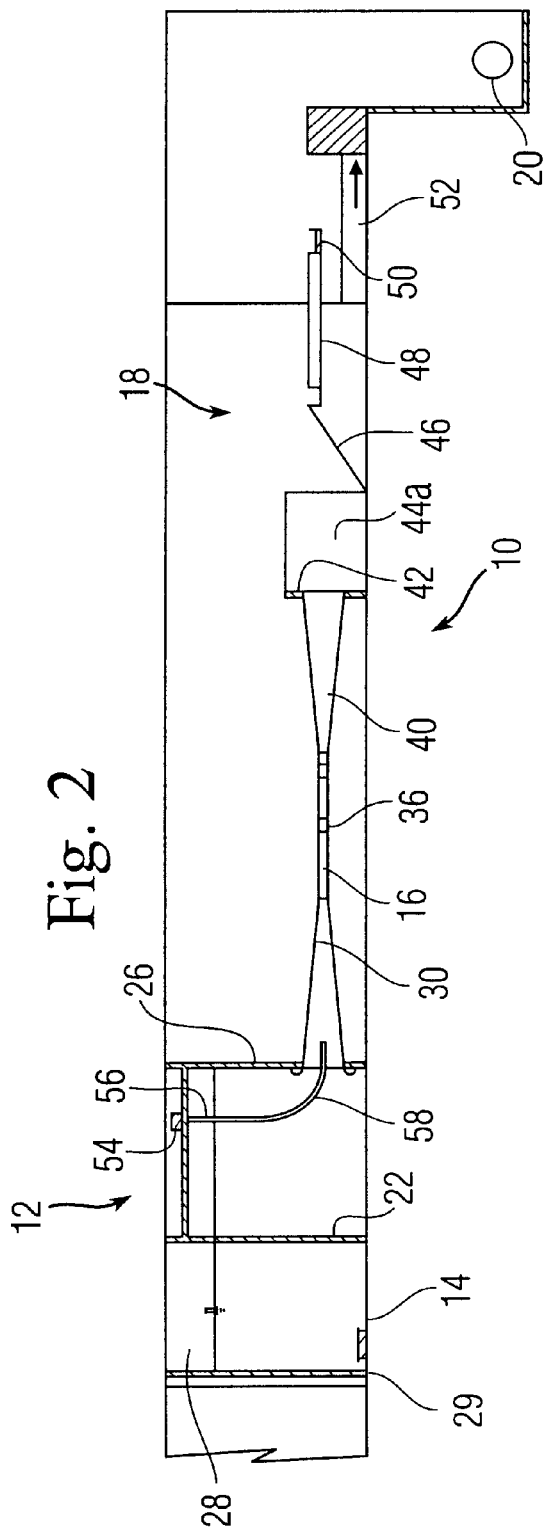
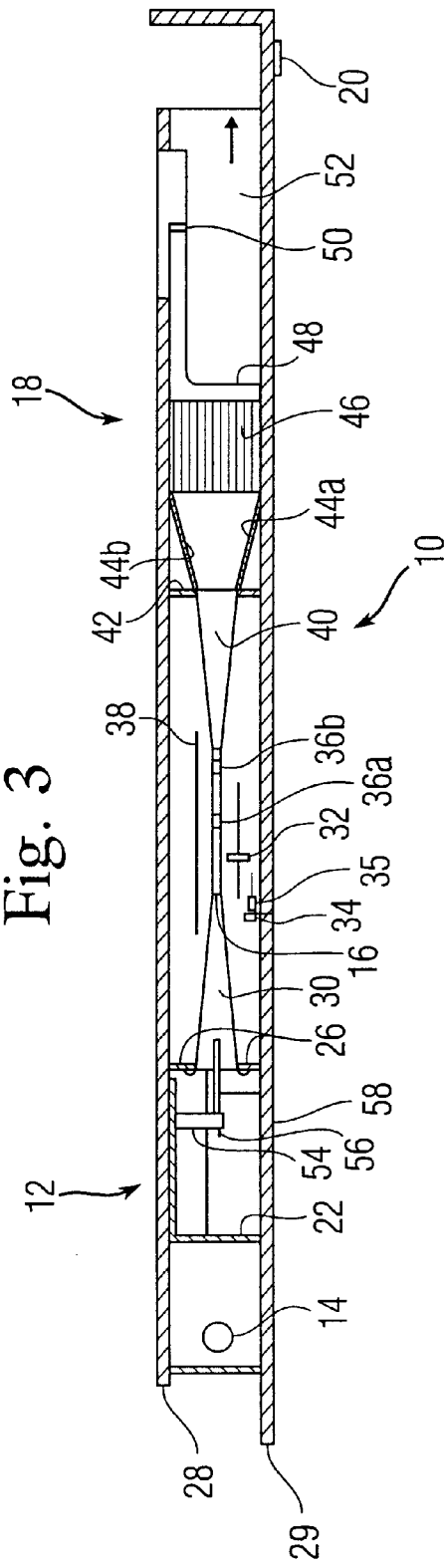

BIO-HYDRAULIC TURBINE TESTING SYSTEM

BACKGROUND OF THE INVENTION

1. Field of the Invention

This invention relates generally to the field of development of fish friendly hydraulic systems, and more specifically, relates to a bio-hydraulic testing system for simulating flow conditions within a hydraulic system to test the effect on fish of specific hydraulic components and flow conditions.

2. Related Art

There is an increasing concern with increasing the survivability rate of fish as they pass through hydro power turbines and other passage obstructing structures. To fulfill this need, an improved knowledge of biological and engineering design criteria are required to make hydraulic structures more fish friendly.

As water flows through a hydroelectric power generation plant, over a dam spillway, or about other hydraulic systems, it undergoes numerous changes. These changes result from changes in the dimensions of flow boundary, changes in flow velocities, changing energy forms, and changes resulting from other forces acting on the flow. Objects within the flow, such as fish, affect and are affected by these changes, and some of these changes are harmful.

Specifically, when hydroelectric power installations are operated, a large number of fish typically pass through the hydroelectric turbines. Some of the passing fish suffer injuries caused by contact with fixed of moving machinery within the installation, changes of pressure or turbulence effects.

A number of fish injuries occur because the physical changes within a hydraulic system are translated into hydraulic phenomena which are harmful to fish. These phenomena include turbulence, shear stress, cavitation, and pressure fluctuations. Shear stress results from the movement of two adjacent fluid bodies in different, usually opposite, directions. Hydraulic shear has been widely cited as a source of damage to fish in hydraulic turbines. Cavitation is the formation of a partial vacuum in flowing water. Collapse of the vacuum disturbs water flow resulting in injury to fish.

The hydroelectric power generating community as well as resource agencies are actively looking for ways to reduce the adverse effects that hydroelectric generation plants have on migratory fish. Government as well as private groups are pursuing the development of conceptual designs of "fish friendly" turbines. To meet current environmental design criteria, turbines need to be made more fish friendly and environmentally friendly, and yet continue to efficiently provide power.

Additionally, fish are likely to be damaged by abrasion, strike and grinding injuries. These injuries result from sudden changes in flow direction and boundary dimensions, combined with the presence of structures in the path of the fish. Abrasion damage occurs when a fish rubs against a turbine system component or other object in a flow field. Grinding injuries occur when fish are drawn into gaps of a size close to that of the fish within a hydraulic system. A precise prediction of injury due to abrasion and grinding is not currently possible. Injury to a fish due a collision, or "strike," occurs when a fish collides with a stationary or moving object within the turbine system. The probability of a fish dying from striking an object within the turbine system is variable and not clearly understood. Direct visual observations are not available to correlate mortality to strike, and to verify existing strike probability models.

There is significant literature concerning injury to fish resulting from contact with hydraulic systems. However, surprisingly little is known about the effects of individual hydraulic components on fish or the effects brought about by design changes to individual components.

Development of fish friendly hydraulic systems, such as turbines, spillways, and fishways requires the presence of reliable basic engineering and biological design data. This data includes quantitative estimations of injury mechanisms to fish as they pass through these systems. At present, there is no known testing apparatus in the field capable of replicating flow conditions similar to those encountered by fish on their migratory route.

SUMMARY OF THE INVENTION

A bio-hydraulic testing system is provided for simulating the effect on fish of at least one hydraulic system component. In a preferred embodiment, the system comprises: a water flow introduction means; a fish introduction system means; a flow introduction conduit including an entrance end in communication with the fish introduction means and the water flow introduction means so as to receive a water flow containing fish and further including an exit end; a testing module, connected to the exit end of the flow introduction conduit so as to receive said water flow; monitoring means for monitoring and recording fish activity in the water flow in the testing module; a flow exit conduit including an entrance end connected to the testing module and an exit end; a fish collection means located downstream of the exit end of the exit conduit for collecting fish exiting from the testing module; and discharge means for discharging the water from the testing system.

Preferably, the water flow introduction means comprises a headpond for containing water, and means for reducing flow turbulence within the headpond; and the water introduction means comprises an inlet pipe, in fluid communication with the headpond, for introducing water to the headpond.

Advantageously, the fish introduction system comprises a tank for holding fish until introduction thereof, an injection pipe, connected at one end to the tank and having an opposite end dispersed in proximity to the introduction conduit, for transferring fish from the fish tank to the entrance conduit, and a slide gate mounted on the injection pipe for controlling introduction of the fish to the introduction conduit.

Alternatively, the water flow introduction means preferably comprises an inlet pipe connected to the introduction conduit, and the fish introduction means comprises inlet means for introducing the fish directly into the inlet pipe. Advantageously, the inlet means for introducing the fish directly into the inlet pipe comprise a fish introduction member connected to the inlet pipe at a non-perpendicular angle to the inlet pipe for introducing fish into the inlet pipe, and a slide gate mounted on the fish introduction member for controlling the introduction of fish.

Preferably, the introduction conduit is tapered inwardly from the entrance end to the exit end, and the exit conduit is tapered outwardly from the entrance end towards the exit end.

Advantageously, at least part of the entrance conduit comprises a light transparent material for enabling visual monitoring of fish.

Preferably, at least part of the testing module comprises a light transparent material for enabling viewing of at least part of the interior of the testing module from outside the module.

Advantageously, the monitoring system comprises a video camera for capturing images from the testing module, and means for controlling the video camera. Alternatively, the monitoring means preferably comprises a plurality of tags adapted for attachment to a plurality of fish, and at least one antenna, disposed in proximity to the testing module, for receiving at least one signal from the plurality of tags.

Preferably, the material comprising the light transparent part of the testing module comprises one of a clear acrylic material and a clear plexiglass material.

Advantageously, the testing module comprises at least one wicket gate attached to an end of the testing module.

Preferably, the testing module comprises at least one turning vane disposed within the testing module. Advantageously, the at least one turning vane comprises a pair of turning vanes disposed in alignment to each other relative to the direction of water flow through the testing module. Alternatively, the at least one turning vane preferably comprise a pair of turning vanes disposed in a non-aligned relation to each other relative to the direction of water flow through the testing module.

Preferably, the testing module comprises a cavitation element disposed within the testing module for producing cavitation therein.

Advantageously, the testing module comprises a turbine blade element for reproducing conditions in proximity to a turbine, and means for adjusting the turbine blade element to control blade speed, blade tilt, blade shape, and the number of turbine blades.

Preferably, the testing module comprises a testing element disposed within the testing module, and means attached to the testing element for adjusting the orientation of the testing element within the module.

Advantageously, the fish collection means comprises: transfer means disposed in proximity to the exit end of the exit conduit for transferring fish from the exit conduit; a screen located in proximity to the transfer means for separating the fish from the water flow, so that fish are transferred from the exit conduit to the screen by the transfer means; and a collection trough, disposed adjacent to the screen, for collecting fish. Preferably, the transfer means comprises a pair of guide walls, each guide wall being disposed at one end in proximity to the exit end of the exit conduit and at the opposite end in proximity to the screen.

In addition, a method is provided for simulating the effect on fish of a hydraulic system component using a bio-hydraulic testing system, the method comprising the steps of: introducing a flow of water to the testing system; introducing a plurality of fish into the testing system within the flow of water; directing the flow of water with the fish therein into a testing module; simulating the effect on the fish of at least one hydraulic system component within the testing module; monitoring and recording fish activity within the testing module during the stimulating step; and transferring the fish from the testing module to a fish collection means for collection.

The testing system of the invention isolates hydraulic components and phenomena and allows study of the effects of each so as to understand and predict the effects of each upon fish. This testing facilitates improved design for such components. Improvements of such individual components result in safer passage for fish.

Other features and advantages of the invention will be set forth in, or will be apparent from, the detailed description of the preferred embodiments which follows.

BRIEF DESCRIPTION OF THE DRAWINGS

FIG. 2 is a schematic cross sectional view, drawn to an enlarged scale, of the embodiment of the testing system of the invention shown in FIG. 1.

FIG. 3 is a schematic top plan view, partially in section, of the testing system illustrated in FIG. 2.

DESCRIPTION OF THE PREFERRED EMBODIMENTS

Figure 1:
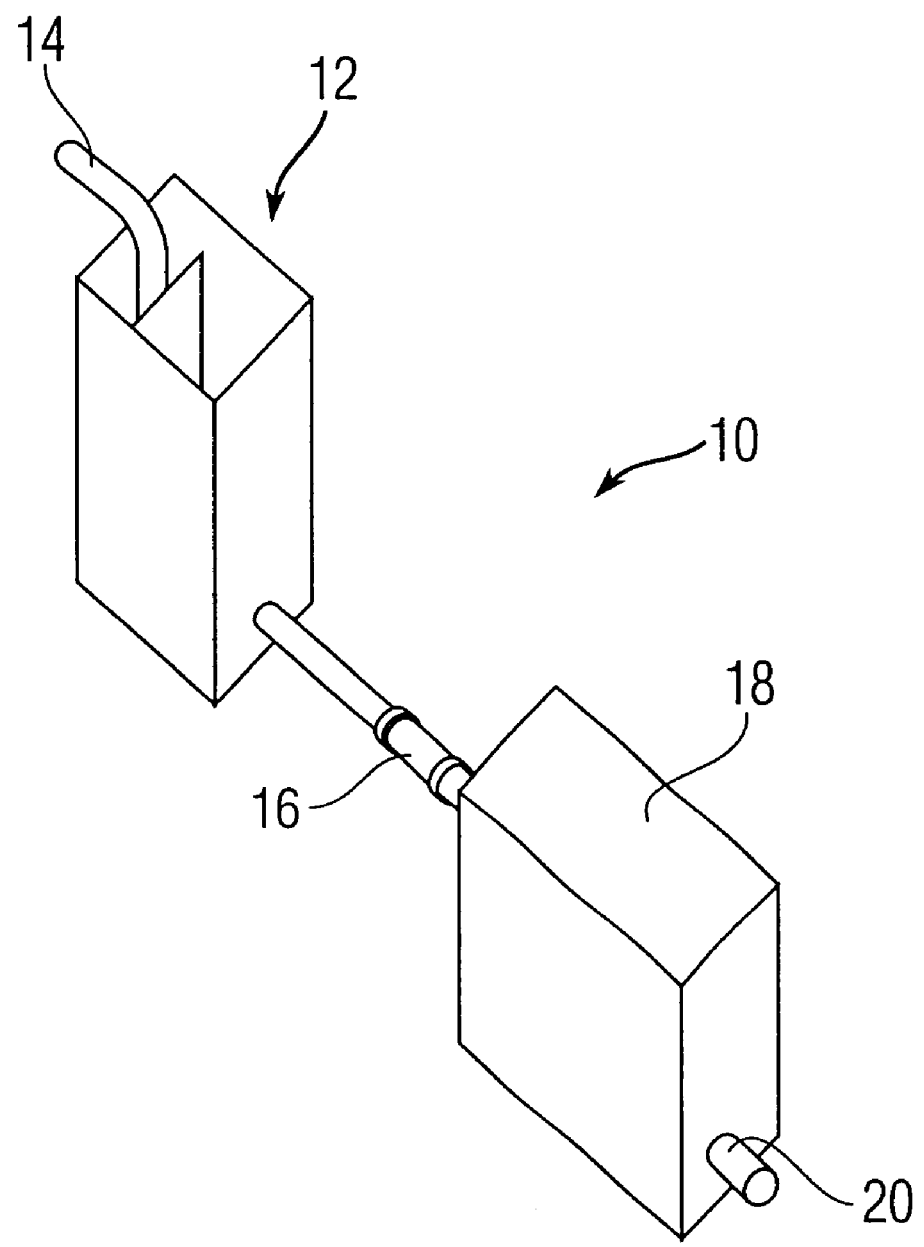
FIG. 1 is a schematic perspective view of the basic units of a preferred embodiment of the testing system of the invention.

Referring to FIG. 1, a bio-hydraulic testing system, generally denoted 10, is shown. In the embodiments disclosed herein, the testing of fish will be described. It is to be understood that the term "fish" means any species of suitable migratory aquatic animal.

In the illustrated embodiment of the testing system 10, the testing system 10 includes a headpond 12 into which water flows and in which a desired water level is maintained. The headpond 12 is typically designed to simulate the forebay of a hydroelectric dam. A flow introduction device 14 supplies water to the testing system 10 so as to maintain the water level in the headpond 12 and to maintain a flow through the entire testing system 10. Water also flows out from the headpond 12 and through a testing module 16 to a fish collection system or holding tank 18.

After tests are concluded in the testing module 16, water flows out from the testing system 10 and, in particular, is discharged through a flow discharge outlet 20. The fish are separated from the flow of water after testing and are safely collected. The system is based on the principle that hydraulic conditions in a prototype hydroturbine system can be reproduced inside a controlled laboratory setting.

The volume of water within the system has to be large enough, and hence the system itself must be large enough, to accommodate migratory fish of interest. The size of the apparatus is critical because it is important for the accuracy of the test results that migratory test fish feel as if they are in a real turbine system. Otherwise, the innate behavior of the fish may alter, resulting in incorrect test data.

Referring to FIGS. 2 and 3, a more detailed embodiment is illustrated and corresponding elements have been given the same reference numbers throughout the figures. In this embodiment, the testing system 10 is used to simulate conditions within a hydro-electric turbine. However, it is to be understood that the testing system is capable of being used to test conditions within any suitable hydraulic system.

In FIGS. 2 and 3, the headpond 12 is defined by a pair of bulkheads or end walls 24, 26, and a pair of testing system outer walls or side walls 28, 29. A flow straightener 22 is provided within the headpond 12 so as to limit turbulence within the headpond 12.

A water flow introduction device or pipe 14 is provided and in the illustrated embodiments, the water flow introduction device or pipe 14 is comprised of a 36 inch diameter inlet pipe. The inlet pipe 14 fills the headpond 12 with water to a level within the headpond 12 sufficient to create the desired hydraulic conditions within the testing system 10.

A fish introduction system for introducing fish into the testing system 10 is provided, which, in this embodiment, is comprised of a fish tank 54, a slide gate 56, and a fish injection pipe 58. The fish tank 54 holds the fish until the fish are introduced into the system. When it is time for introducing the fish, the fish move through the fish introduction pipe 58 and when the fish reach the end of the fish introduction pipe 58, they move into an introduction conduit 30. The edges and transition areas of the fish tank 54 and the fish injection pipe 58 are smooth so as to minimize injury to fish prior to testing.

The introduction conduit 30 is in proximal contact with the fish introduction pipe 58 on one end and is attached to an opening in the inner bulkhead 26 at the same end. The result is that the introduction conduit 30 simultaneously receives a flow of water from the headpond 12 and a flow of fish from the fish tank 54 during testing. The flow introduction conduit 30 is attached at the opposite end to the testing module 16.

The fish introduction pipe 58 is constructed so that its size and location provide a flow velocity equal to the velocity of the flow within the introduction conduit 30 to thereby smooth the transition from the introduction pipe 58 to the introduction conduit 30. Because of the equality of velocities, the fish do not experience adverse hydraulic conditions prior to testing.

Fish move through the flow introduction conduit 30 to the testing module 16. As indicated above, the fish introduction conduit 30 provides fish a smooth transition from the fish tank 54 to the testing module 16, and such smooth transitions are important in that they minimize hydraulic losses and reduce turbulence in the flow field, and thereby reduce the possibility of injury or disorientation to the fish before the fish reach the test module 16.

The flow introduction conduit 30 is shaped so as to channel the water flow from the headpond 12 and increase the velocity of the flow to the testing module 16 up to the velocity of a real flow within the hydraulic system being studied. Hence, the water flow volume and velocity leading to the testing module 16 are sufficient to accurately simulate flow conditions within a turbine system. In this embodiment, the fish introduction conduit 30 is tapered inwardly from the bulkhead 26 to the testing module 16.

Advantageously, the flow introduction conduit 30 can be constructed of a clear material, such as a clear acrylic. Construction with a clear material enables visual monitoring of fish prior to entry of the fish into the testing module 16.

As indicated above, the flow from the fish introduction conduit 30 is transferred to the testing module 16 and the fish thus move through the testing module 16 which accurately reproduces the flow conditions and mechanical effects of a hydraulic component or components of a real turbine system to be tested. Therefore, the effects upon the fish due to conditions within the testing module 16 will be similar to those which would occur within a real turbine system. Testing conditions are controlled and can be repeated for any number of experiments.

Advantageously, the testing module 16 is constructed of a suitable clear material so as to enable visual access to the test components inside the testing module 16. By way of example, the module can be constructed of plexiglass or a clear acrylic. The testing module 16 may be rectangular, round or any other suitable shape. In the embodiments described herein, the testing module 16 is rectangular.

A monitoring system 32 (see FIG. 3) which is described below and which is located in proximity to the testing module 16 so as to record the testing within the module and results thereof.

After the fish have moved through the testing module 16, testing is complete. The fish are transferred from the testing module 16 into an exit conduit 40. The exit conduit 40 is connected to the testing module 16 at one end, and is disposed in proximity to a fish collection system 18 at the opposite end. The exit conduit 40 provides the fish with a smooth transition from the testing module 16 to the fish collection system 18 so as to minimize injury or disorientation to the fish after leaving the testing module 16.

The flow exit conduit 40 is shaped so as to reduce the velocity of the water flow from the testing module 16. In this embodiment, the exit conduit 40 is tapered outwardly from the testing module 16 to an exit bulkhead 42. The exit end of the fish exit conduit 40 is attached to bulkhead 42.

The fish are transferred from the exit conduit 40 to an area defined by a pair of guide walls 44a, 44b (see FIG. 3). The fish move between the guide walls 44a, 44b to a screen 46. The guide walls taper outwardly from the exit bulkhead 42 to the screen 46.

The fish are transferred from the area defined by the guide walls 44a, 44b to the screen 46. In this embodiment, the screen 46 is a wedge wire screen. The screen 46 is disposed at an angle with respect to the guide walls 44a, 44b and extends from the bottoms thereof to a fish collection trough 48. The fish in the collection trough 48 can be removed from the trough for study. The trough includes an overflow weir 50 so as to remove excess water from the trough 48. The flow of water moves along a channel 52 to the water discharge outlet 20 which discharges the water from the testing system 10.

The fish are collected from the fish collection trough 48 for examination and observation. Injuries, instant and delayed mortality, and disorientation are related to the hydraulic conditions and the type of turbine component being tested, and can be correlated to such. The tests can be repeated using a variety of turbine component designs and hydraulic conditions. The test results are used to determine safe hydraulic phenomena limits and fish friendly turbine component designs. The highly controlled environment within the testing system 10 offers accurate reproduction of hydraulic conditions and repetition of experiments with the use of fish samples of an adequate size. Accurate reproduction and repetition results in usable data.

Referring specifically to FIG. 3, the monitoring system 32 referred to above preferably comprises a high speed video camera. The video camera 32 is located immediately outside the testing module 16. As indicated hereinbefore, transparent material such as clear acrylic is preferably used to fabricate the testing module 16 so as to enable researchers to use the high-speed video camera 32 in observing fish behavior. As the fish move through the testing module 16, the video camera 32 monitors the activity in the visible portion of the interior of the testing module 16. A computer system 34 controls the high speed video camera 32.

The high speed video camera 32 documents fish movement, behavior, and damage to the fish. A mirror 38 placed on the opposite of the testing module 16 increases the field of view which can be recorded.

In addition, a system of tags and antennas are preferably used in the monitoring process. A plurality of the fish are fitted with tags (not shown) which transmit an electronic signal. By way of example, the fish may be fitted with Passive Integrated Transponder (PIT) tags which are commercially available. The signal from each tag is detected by tag detection antennas 36a, 36b which are of a commercially available type and which are disposed at suitable locations along the testing module 16. The antennas send an electronic signal to a computer controlled stepper motor 35 and to the high speed camera 32 to start documenting fish movement and behavior. The tag/antenna system enables improved control of monitoring.

Figure 4:
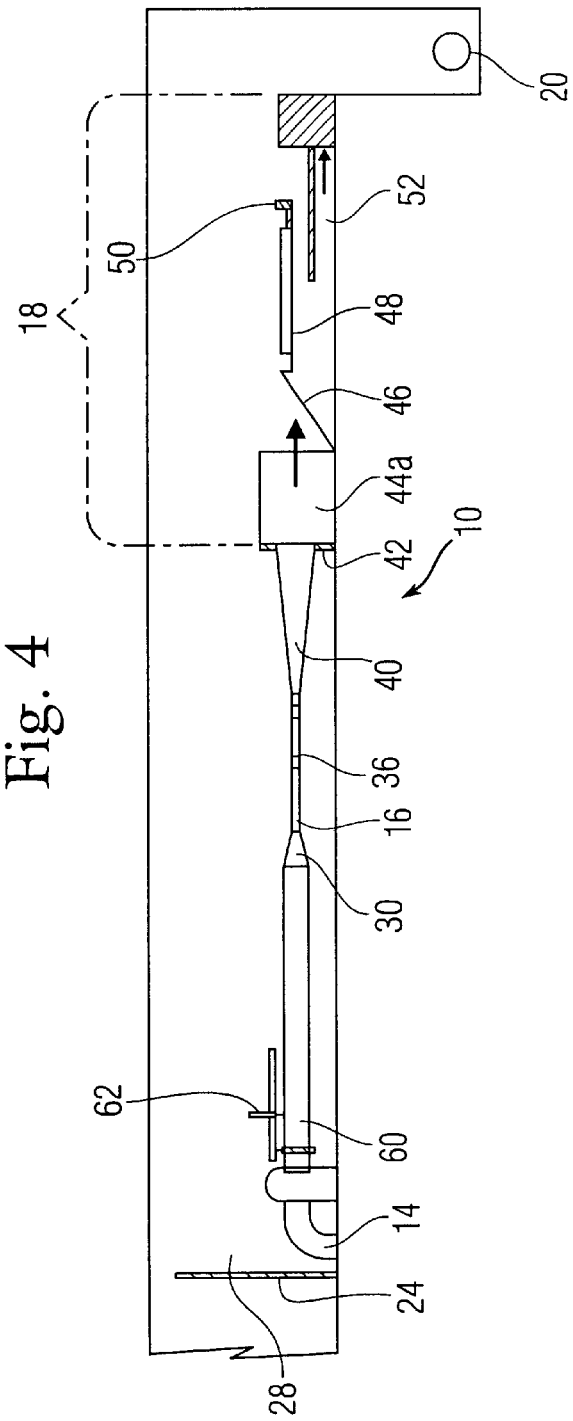
FIG. 4 is a schematic cross sectional view of a further embodiment of the testing system of the invention.

Turning to FIG. 4, a testing system 10 is illustrated which is similar to that of FIGS. 2 and 3 but has an alternative water supply system and alternative fish introduction system. In this embodiment, a flow pipe 60 connects the inlet pipe 14 directly to the flow introduction conduit 30 so that water flows directly from the inlet pipe 14 through the testing system 10. A fish introduction arrangement or unit 62 directly accesses, i.e., opens up into, the flow pipe 60 so that the fish are transferred through the fish introduction unit 62 directly into the flow pipe 60.

Figure 5:
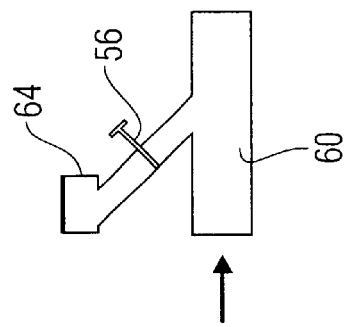
FIG. 5 is a schematic side view elevational view of an alternative embodiment of a fish introduction assembly of the system of the invention.

Referring to FIG. 5, yet another alternative embodiment of the fish introduction arrangement is illustrated. In this embodiment, fish are kept in a fish holding chamber 64. The holding chamber 64 is connected to the flow pipe 60 disposed at an angle, i.e., inclined to, the flow pipe 60. A slide gate 56 controls the introduction of the fish into the flow pipe 60.

FIGS. 6–11 illustrate preferred embodiments of testing component arrangements for the testing module 16. In these embodiments, the system 10 is used to simulate flow conditions about hydro-electric turbine system components such as turning vanes, wicket gates and turbine blades. Flow conditions to be reproduced include velocities, turbulence intensities, and flow separations. The testing is done under laboratory conditions in an accurate and controlled manner.

Figure 6:
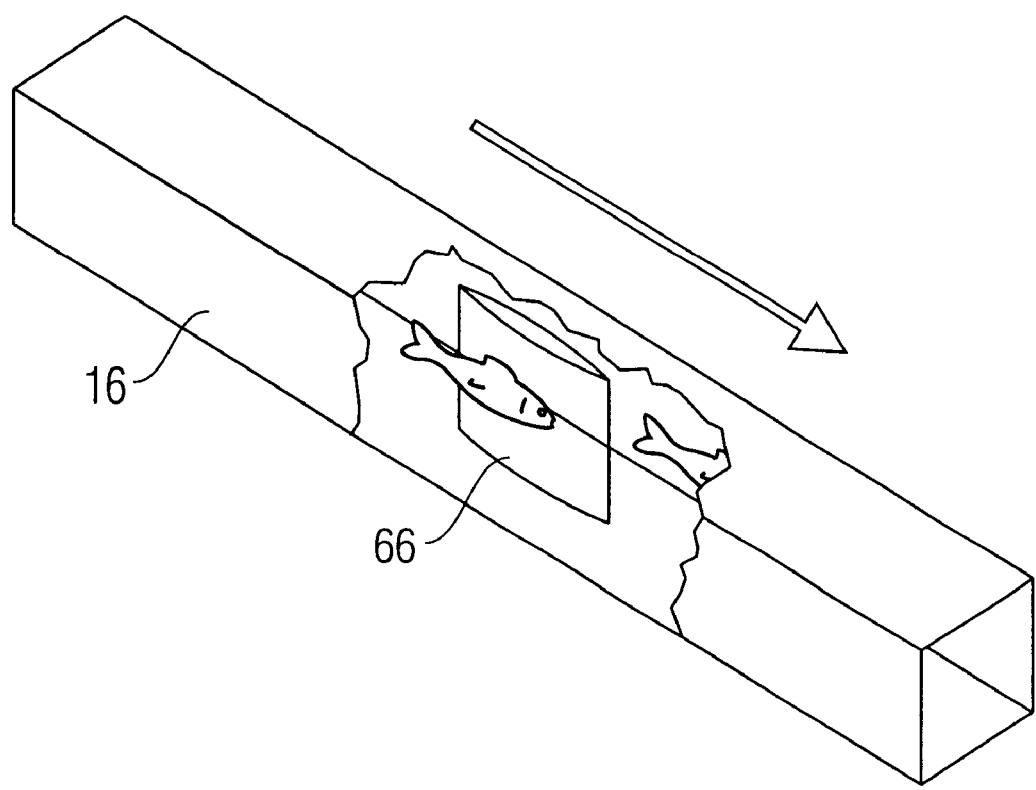
FIG. 6 is a schematic perspective view, partially broken away, of one embodiment of a testing module of the testing system of the invention.

Turning to FIG. 6, one embodiment of the testing module 16 is illustrated wherein, as in the other embodiments described below, a large arrow indicates the direction of flow through the testing module 16. In this embodiment, a single turning vane 66 is present within the testing module 16 for testing.

Figure 7:
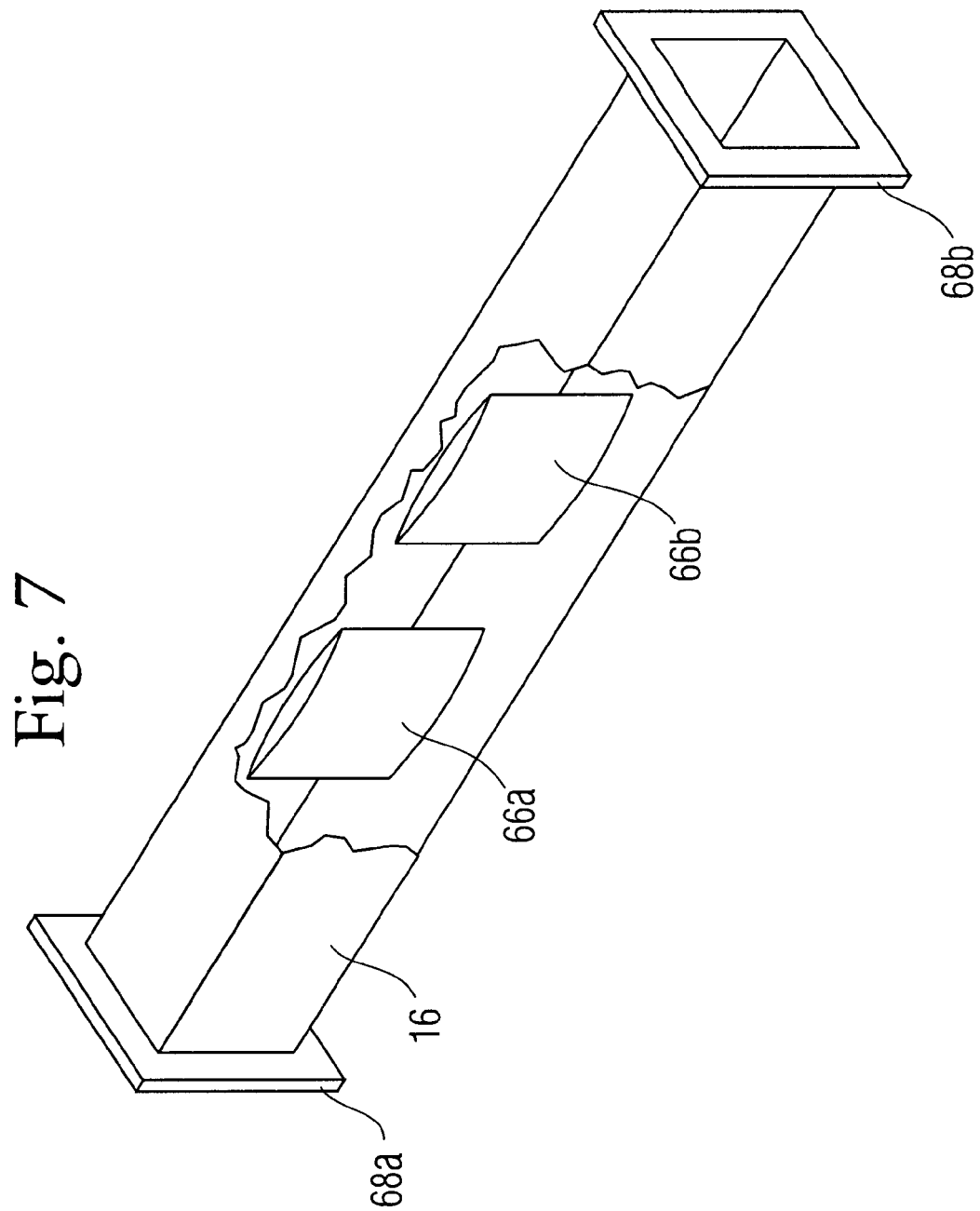
FIG. 7 is a schematic perspective view, partially broken away, of a further embodiment of a testing module of the testing system of the invention.

Turning to FIG. 7, an alternative embodiment of the testing module 16 is illustrated wherein a pair of turning vanes 66a, 66b are disposed within the testing module. The pair of turning vanes 66a, 66b are disposed in alignment with each other relative to the direction of flow through the testing module 16. A pair of wicket gates 68a, 68b are present at opposite ends of the testing module 16.

Figure 8:
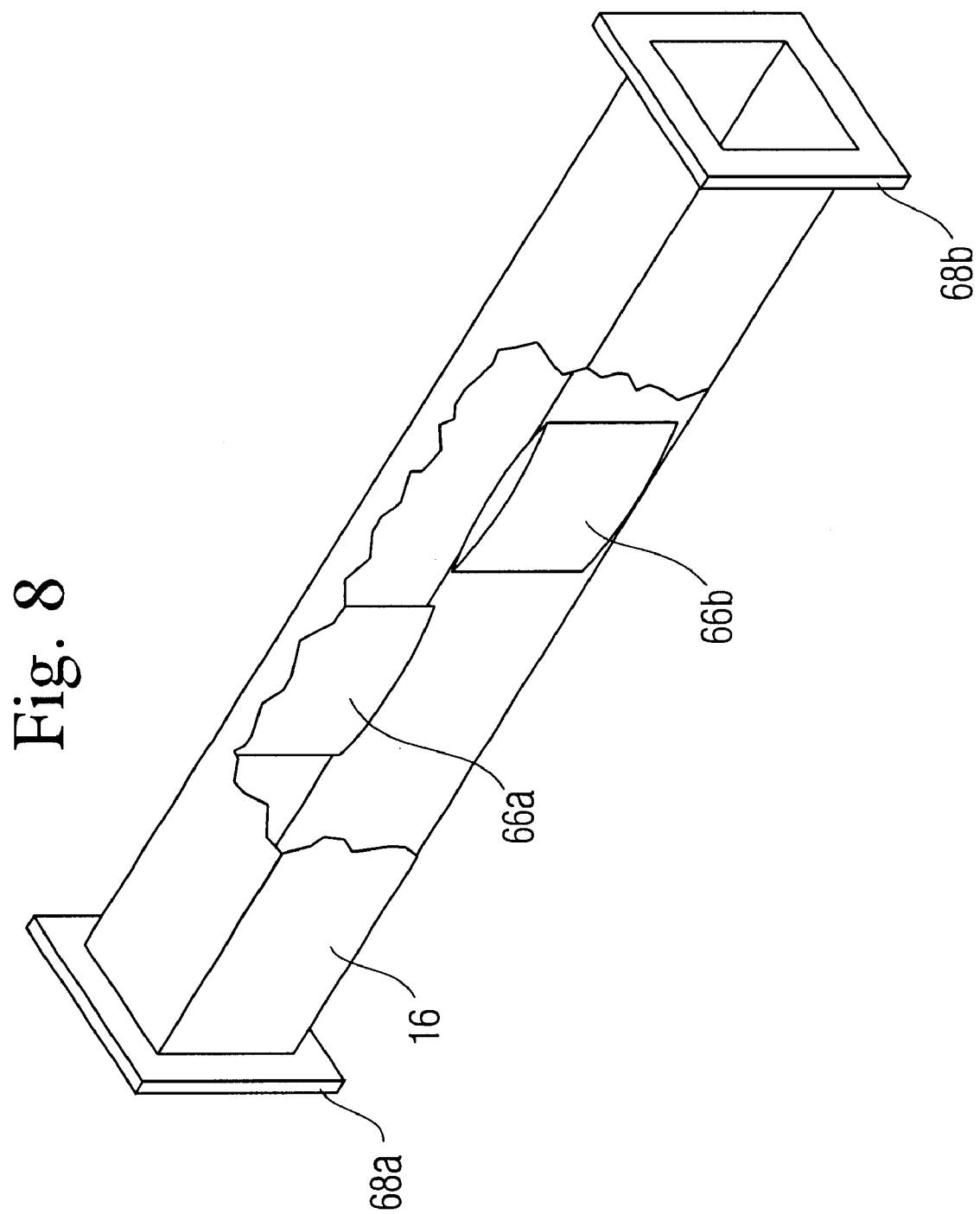
FIG. 8 is a schematic perspective view, partially broken away, of another embodiment of a testing module of the testing system of the invention.

Turning to FIG. 8, a further alternative embodiment of the testing module is illustrated in which the turning vanes 66a, 66b illustrated in FIG. 7 are not in alignment with each other relative to the direction of flow.

Figure 9:
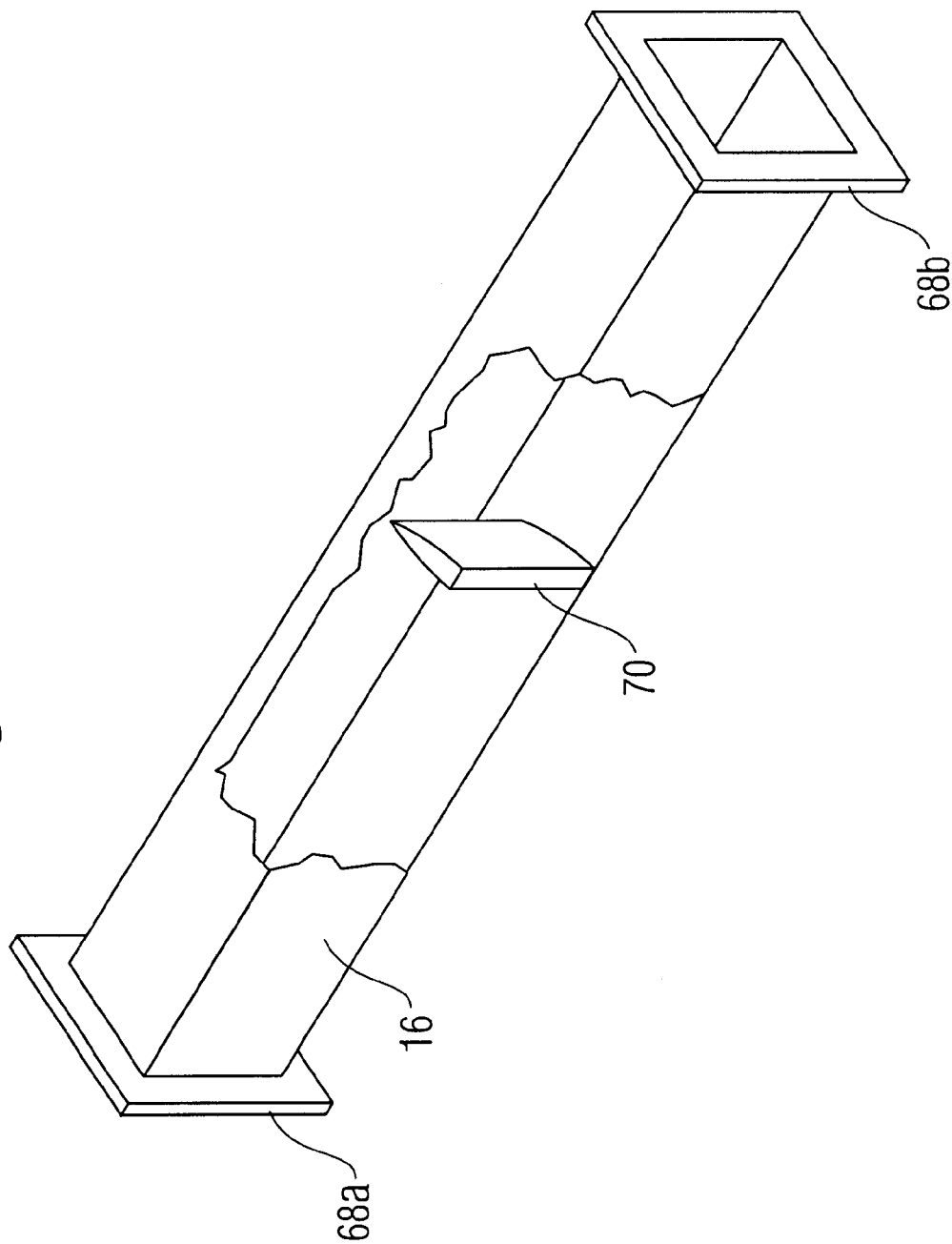
FIG. 9 is a schematic perspective view, partially broken away, of yet another embodiment of a testing module of the testing system of the invention.

Turning to FIG. 9, yet another alternative embodiment of the testing module is illustrated in which the testing module 16 contains a testing element 70 capable of controlled movement within the testing module 16. The testing element 70 may extend transverse or perpendicular to the flow as shown, or extend into the direction of flow (not shown) or extend away from the direction of flow (not shown), depending upon the component to be simulated.

Figure 10:
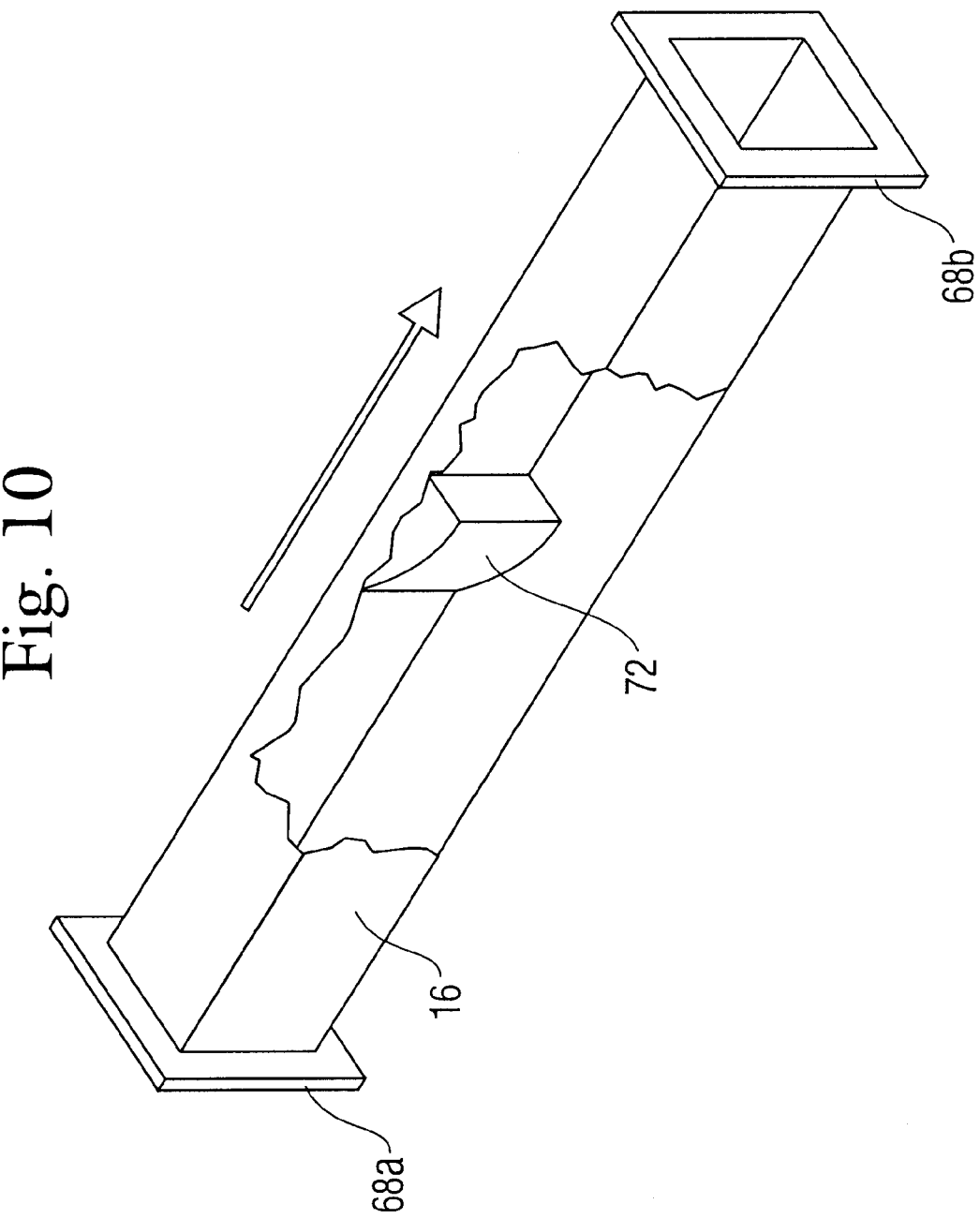
FIG. 10 is a schematic perspective view, partially broken away, of a still further embodiment of a testing module of the testing system of the invention.

Turning to FIG. 10, a still further alternative embodiment of the testing module 16 is illustrated in which cavitation element 72 is secured to a sidewall of module 16 which is capable of producing cavitation within the testing module 16 thereby replicating cavitation conditions in a turbine system.

Figure 11:
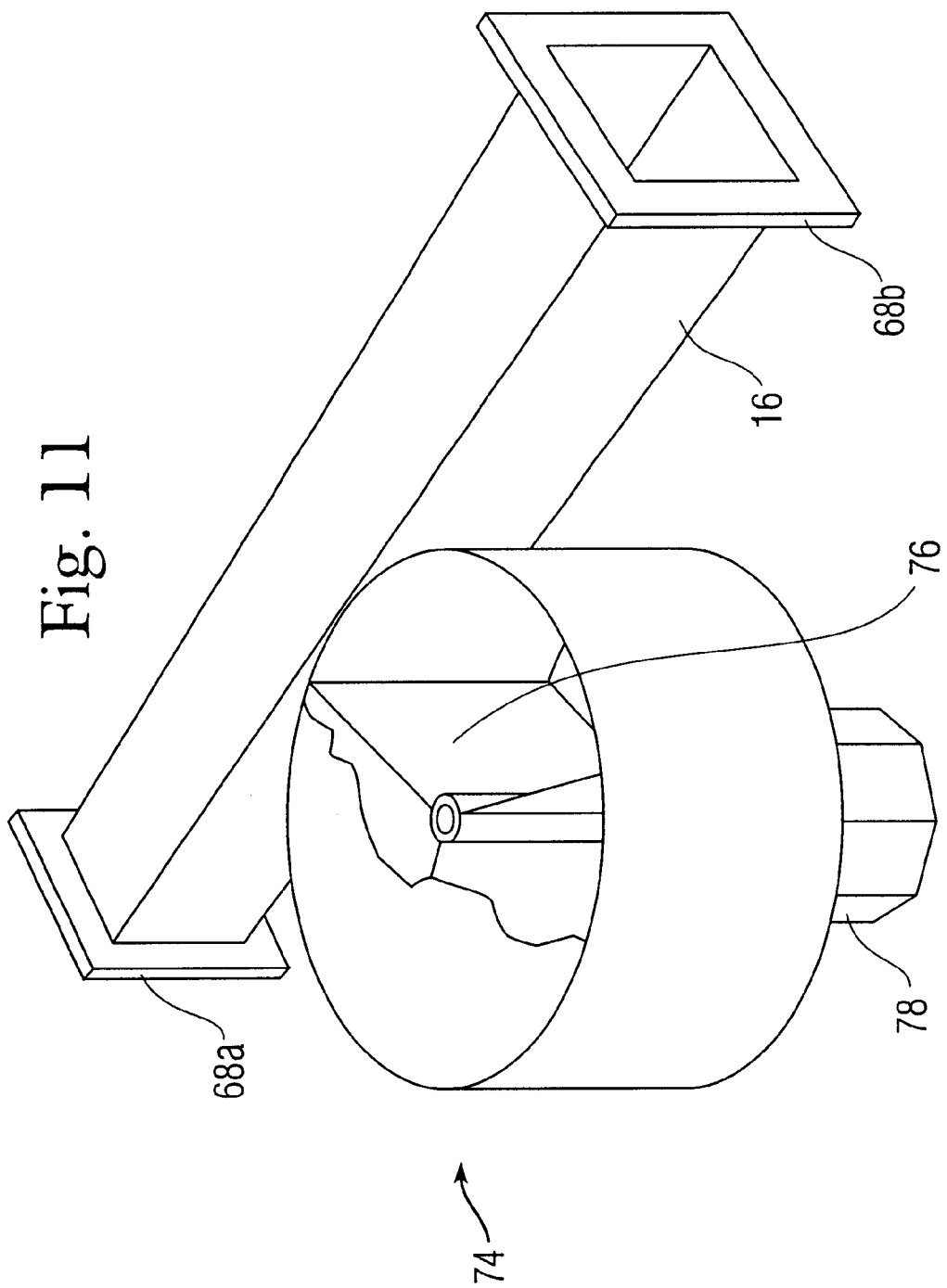
FIG. 11 is a schematic perspective view, partially broken away, of a further embodiment of a testing module of the testing system of the invention.

Turning to FIG. 11, another alternative embodiment of the testing module 16 is illustrated in which a turbine element 74 is located in proximity to the testing module 16. The interior of the turbine element 74 is in contact with the interior of the testing module 16. The turbine element 74 includes a set of test turbine blades 76 for simulating the movement of a set of real turbine blades. A motor 78 turns the blades 76. The turbine element 74 is capable of alteration of speed, alteration of tilt, alteration of shape of the blades 76, and alteration of the number of turbine blades 76. The turbine element 74 is capable of replicating the hydraulic conditions for fish travelling near a variety of hydro-electric turbines.

Although the invention has been described above in relation to preferred embodiments thereof, it will be readily understood by those skilled in the art that variations and modifications can be effected in these embodiments without departing from the scope and spirit of the invention.

What is claimed is:

1. A bio-hydraulic testing system for simulating the effect on fish of at least one hydraulic system component, the system comprising:

a water flow introduction means;

a fish introduction system means;

a flow introduction conduit including an entrance end in communication with the fish introduction means and the water flow introduction means so as to receive a water flow containing fish and further including an exit end;

a testing module, connected to the exit end of the flow introduction conduit so as to receive said water flow;

monitoring means for monitoring and recording fish activity in the water flow in the testing module;

a flow exit conduit including an entrance end connected to the testing module and an exit end;

a fish collection means located downstream of the exit end of the exit conduit for collecting fish exiting from the testing module; and discharge means for discharging the water from the testing system.

2. A bio-hydraulic testing system according to claim 1, wherein the water flow introduction means comprises:

a headpond for containing water; and means for reducing flow turbulence within the headpond;

said water introduction means comprising an inlet pipe, in fluid communication with the headpond, for introducing water to the headpond.

3. A bio-hydraulic testing system according to claim 1, wherein the fish introduction system comprises:

a tank for holding fish until introduction thereof;

an injection pipe, connected at one end to the tank and having an opposite end dispersed in proximity to the introduction conduit, for transferring fish from the fish tank to the entrance conduit; and a slide gate mounted on the injection pipe for controlling introduction of the fish to the introduction conduit.

4. A bio-hydraulic testing system according to claim 1, wherein the water flow introduction means comprises an inlet pipe connected to the introduction conduit;

and the fish introduction means comprises inlet means for introducing the fish directly into the inlet pipe.

5. A bio-hydraulic testing system according to claim 4, wherein the inlet means for introducing the fish directly into the inlet pipe comprises:

a fish introduction member connected to the inlet pipe at a non-perpendicular angle to the inlet pipe for introducing fish into the inlet pipe; and a slide gate mounted on the fish introduction member for controlling the introduction of fish.

6. A bio-hydraulic testing system according to claim 1, wherein the introduction conduit is tapered inwardly from the entrance end to the exit end, and wherein the exit conduit is tapered outwardly from the entrance end towards the exit end.

7. A bio-hydraulic testing system according to claim 1, wherein at least part of the entrance conduit comprises a light transparent material for enabling visual monitoring of fish.

8. A bio-hydraulic testing system according to claim 1, wherein at least part of the testing module comprises a light transparent material for enabling viewing of at least part of the interior of the testing module from outside the module.

9. A bio-hydraulic testing system according to claim 8, the monitoring system further comprising:

a video camera for capturing images from the testing module, and means for controlling the video camera.

10. A bio-hydraulic testing system according to claim 8, wherein the material comprising the light transparent part of the testing module comprises one of a clear acrylic material and a clear plexiglass material.

11. A bio-hydraulic testing system according to claim 1, wherein the monitoring means comprises:

a plurality of tags adapted for attachment to a plurality of fish; and at least one antenna, disposed in proximity to the testing module, for receiving at least one signal from the plurality of tags.

12. A bio-hydraulic testing system according to claim 1, wherein the testing module comprises at least one wicket gate attached to an end of the testing module.

13. A bio-hydraulic testing system according to claim 1, wherein the testing module comprises at least one turning vane disposed within the testing module.

14. A bio-hydraulic testing system according to claim 13, wherein the at least one turning vane comprises a pair of turning vanes disposed in alignment to each other relative to the direction of water flow through the testing module.

15. A bio-hydraulic testing system according to claim 13, wherein the at least one turning vane comprises a pair of turning vanes disposed in a non-aligned relation to each other relative to the direction of water flow through the testing module.

16. A bio-hydraulic testing system according to claim 1, wherein the testing module comprises a cavitation element disposed within the testing module for producing cavitation therein.

17. A bio-hydraulic testing system according to claim 1, wherein the testing module comprises a turbine blade element for reproducing conditions in proximity to a turbine, and means for adjusting the turbine blade element to control blade speed, blade tilt, blade shape, and the number of turbine blades.

18. A bio-hydraulic testing system according to claim 1, wherein the testing module comprises:

a testing element disposed within the testing module; and means attached to the testing element for adjusting the orientation of the testing element within the module.

19. A bio-hydraulic testing system according to claim 1, wherein the fish collection means comprises:

transfer means disposed in proximity to the exit end of the exit conduit for transferring fish from the exit conduit;

a screen located in proximity to the transfer means for separating the fish from the water flow, so that fish are transferred from the exit conduit to the screen by the transfer means; and a collection trough, disposed adjacent to the screen, for collecting fish.

20. A bio-hydraulic testing system according to claim 19, wherein the transfer means comprises a pair of guide walls, each guide wall being disposed at one end in proximity to the exit end of the exit conduit and at the opposite end in proximity to the screen.

21. A method for simulating the effect on fish of a hydraulic system component using a bio-hydraulic testing system, said method comprising the steps of:

a) introducing a flow of water to the testing system;

b) introducing a plurality of fish into the testing system within the flow of water;

c) directing the flow of water with the fish therein into a testing module;

d) simulating the effect on the fish of at least one hydraulic system component within the testing module;

e) monitoring and recording fish activity within the testing module during the stimulating step; and (f) transferring the fish from the testing module to a fish collection means for collection.

* * * * *